United States Patent Office 3,508,938
Patented Apr. 28, 1970

3,508,938
ADHESIVE MATERIAL AND THE METHOD OF
MAKING AND USING THE SAME
Francis Lee Jones, Atlanta, Ga., assignor to Lockheed
Aircraft Corporation, Burbank, Calif.
No Drawing. Filed June 22, 1966, Ser. No. 559,411
Int. Cl. C03c 5/00, 7/02
U.S. Cl. 106—48                    4 Claims

ABSTRACT OF THE DISCLOSURE

A ceramic adhesive for bonding refractory metals uses a borosilicate glass as a carrier for metal additives. It has been found that metal additives to borosilicate glass react with the refractory metal surfaces to be bonded forming high strength, intermetallic phases. The borosilicate glass provides a medium in which this reaction can take place. Under bonding pressure, a large portion of the glass flows out of the lap area leaving essentially the intermetallic bond.

---

This invention relates to adhesives and more particularly to an adhesive material having high strength at high temperatures. As used herein, "high strength" means strength in excess of two thousand (2,000) pounds per square inch both in shear and tension. "High temperature" means temperature on the order of two thousand two hundred (2,200°) degrees Fahrenheit.

In recent years, materials such as refractory metals have come into wide use where there is a requirement for high strength and comparatively low weight in a high heat environment. In the use of such materials, there arises a need in some applications to bond two sheets of the material together or to a honeycomb structure of the same material, for example.

This bonding requirement has in the past placed substantial limitations on the use of these materials because no adhesive has been developed which has high strength at the high temperatures to which these materials are capable. Welding and brazing techniques employed with lower temperature materials are not always successful with the newer, more exotic materials like refractory metals, and where employed new techniques and apparatus are required. In addition these techniques are not only expensive and time taking, but totally undesirable in some cases due to limited work areas and accessibility problems.

The present invention is directed to the solution of the above and other problems by providing an adhesive material consisting essentially of ceramic oxides and metallic fillers and having high strength at elevated temperatures. The composition and preparation of this adhesive material are especially designed to give it a relatively long storage or shelf life while at the same time being easily applied and having a short firing cycle.

The adhesive material herein contemplated is compounded within the following formula ranges:

| Ingredient: | Composition (parts by weight) |
|---|---|
| Aluminum oxide ($Al_2O_3$) | 0–10 |
| Boron oxide ($B_2O_3$) | 45–55 |
| Chromium oxide ($Cr_2O_3$) | 0–10 |
| Silica ($SiO_2$) | 35–45 |
| Zirconia ($ZrO_2$) | 0–10 |
| Colloidal alumina | 5–30 |
| Water ($H_2O$) | 25–150 |
| Nickel (Ni) | 0–30 |
| Iron (Fe) | 0–30 |

Selected quantities, depending upon the particular application, of the above oxide components $Al_2O_3$, $B_2O_3$, $Cr_2O_3$, $SiO_2$, and $ZrO_2$ are initially dry blended and fired at a selected temperature. The molten batch is then quenched in water to form a frit which is dried overnight, i.e., approximately twelve (12) hours, at a selected temperature. After drying, the required amount of colloidal alumina and water is added, and the mixture is ground or pulverized to a predetermined size on the order of minus 200 mesh. The slip is then screened to assure the pulverized or powdered condition and stored in a container, preferably one of non-metallic material. The metal additives, i.e., nickel and iron, in selected amounts in powdered or pulverized form within the range of about minus 150 and minus 400 mesh respectively may be added into the slip if the adhesive is to be used immediately. However, the metal reacts vigorously in the presence of colloidal alumina after approximately twenty four (24) hours, rendering the adhesive unusable. Accordingly, it is for the purpose of giving the slip a long shelf life that the nickel and iron are not added until just prior to use of the adhesive.

When it is desired to use the adhesive, the parts to be bonded thereby are each thoroughly cleaned following conventional practice and the adhesive material is applied and allowed to dry. When thoroughly dried, as indicated by the color of the adhesive material changing from vivid to pale (green or grey depending upon the metal content), and the parts to be joined are brought into intimate contact, one with another (preferably pressure being applied) to produce the specimen. Thereafter, the specimen is fired at a selected temperature in an inert gas or vacuum atmosphere and allowed to cool to a stable temperature.

In order to more fully illustrate the instant invention, specific adhesive material compositions are shown in the following Table I. While other compositions were formulated and tested, these are selected here because they showed the best results under test.

TABLE I.—COMPOSITION (PARTS BY WEIGHT)

| Ingredient | Examples | | | |
|---|---|---|---|---|
| | 1 | 2 | 3 | 4 |
| Aluminum oxide ($Al_2O_3$) | 5 | 10 | | 5 |
| Boron oxide ($B_2O_3$) | 50 | 45 | 55 | 50 |
| Chromium oxide ($Cr_2O_3$) | 5 | 5 | 10 | |
| Silica ($SiO_2$) | 40 | 35 | 35 | 35 |
| Zirconia ($ZrO_2$) | | | 5 | 10 |
| Colloidal alumina | 10 | 10 | 10 | 10 |
| Water ($H_2O$) | 150 | 150 | 150 | 150 |
| Nickel (Ni) | 26 | 26 | 26 | 26 |
| Iron (Fe) | 26 | 26 | 26 | 26 |

A frit composition was prepared by melting the oxide components, $Al_2O_3$, $B_2O_3$, $Cr_2O_3$, $SiO_2$, and $ZrO_2$ in the quantities listed above together in a frit furnace for about one half hour until molten at about 2650° F. In so doing, each component was weighed to the nearest 0.1 gram and dry mixed with the other components.

When complete intersolution was achieved, each batch was quenched in water to form a frit which was dried overnight at a temperature of about 250° F. The frit was then placed in a ball mill along with an addition of the suspension agent, colloidal alumina and tap water and rolled for approximately twenty (20) hours until it passed a 200 mesh sieve. The slip thus formed was removed from the ball mill and placed in a non-metallic container such as polyethylene for storage. When it was desired to use the slip to form the adhesive material, minus 200 mesh nickel and minus 400 mesh iron were added to the slip.

The adhesive thus formed was then applied to the surfaces to be bonded (these parts were a refractory metal, viz, molybdenum) by brushing (although dipping, spraying, etc., could have been employed, the idea being to get a uniform coating) in a layer of approximately 0.04 inch and dried by blowing air over it until its color changed from a vivid to a pale green. Drying was then continued in a forced convection oven at about 250° F. for at least four (4) hours, care being taken to heat the oven slowly at first to prevent cracking of the adhesive.

After completion of the drying steps, the component parts were placed in intimate contact and pressure applied by clamping, using a jig or other appropriate means, and the assembly was then heated to approximately 2700° F. in a vacuum or inert atmosphere furnace. The temperatures of the assemblies were monitored with the aid of thermocouples and once the whole assembly reached the temperature of 2700° F. heating was discontinued. Cooling was done in place while maintaining vacuum or inert atmosphere.

Test specimens were bonded with adhesives prepared in accordance with each of the Table I examples and subjected to a temperature of approximately 2200° F. in vacuo while being tested for tensile and shear strength. This testing was conducted in a 30,000 pound Riehle universal testing machine on the 1500 pound range. This machine has an accuracy of 0.5% of indicated load or 2.5 pounds whichever is greater. Specimens and grips were enclosed in a 4200° F. vacuum furnace which provided a high temperature test environment at a pressure of $2 \times 10^{-5}$ to $5 \times 10^{-5}$ millimeters mercury. The specimens were heated from room temperature to the test temperature in not less than 10, nor more than 30 minutes. The temperature stabilized in about 3 minutes then the load was applied at a constant 1250–1350 p.s.i. per minute to failure.

These tests disclosed that the specimens of each of the Table I examples could withstand an average shear stress of 2000 p.s.i. The average flat-wise tensile strength of the adhesives described in Table I was 2000 p.s.i., with a maximum value of 3100 p.s.i. Moreover, in testing one speciment constructed in accordance with Example 2 for shear strength, the molybdenum failed without breaking the bond; and in all of the Example I specimens which were tested for shear strength, failure of the molybdenum was experienced without failure of the bond. Micro-probe analysis of the bond line profile of the Example 1 adhesive showed the main constituents present to be nickel, iron and the refractory metal being bonded with a trace of silicates, indicating that the ceramic acts as a carrier for the metallic additions since it is not a part of the final bond.

To establish the range within which the nickel and iron mill additions to the base ceramic frit could be varied, a number of adhesives were prepared using the same procedure described above. In the preparation of these adhesives, various amounts of nickel and/or iron were added to the Example 1 slip.

Tests similar to those previously described showed that these specimens could withstand stresses which would fail the metal without breaking the bond, indicating the wide range of nickel to iron proportions possible. These tests further showed that the basic adhesive containing little metal additions has poor strength properties while an addition of metal in the neighborhood of 50 parts by weight for every 100 parts by weight of slip appeared to produce the strongest bonds.

In summary, the adhesive of this invention provides an excellent bond which is particularly adapted for use with refractory metals because its coefficient of thermal expansion is compatible therewith. Also, the metal ingredients can be added to the basic ceramic slip just before use to prevent decomposition and give the adhesive a long shelf life. The amount of the metal ingredients in proportion to the whole of the adhesive material may be varied within a wide range while maintaining the strength characteristics thereof.

While specific formulations have hereinabove been given, these are primarily for the purpose of facilitating an understanding of the invention rather than to place limitations thereon.

What is claimed is:

1. An adhesive material comprising the combination with a first component in the form of a slip consisting essentially of the following ingredients in the form of a frit, all expressed on an approximate weight basis and totalling 100 parts:

|  | Parts |
|---|---|
| Aluminum oxide | 0–10 |
| Boron oxide | 45–55 |
| Chromium oxide | 0–10 |
| Silica | 35–40 |
| Zirconia | 0–10 | and a suspension agent consisting essentially of the following ingredients expressed on an approximate weight basis:

|  | Parts |
|---|---|
| Colloidal alumina | 10 |
| Water | 150 | the mixture being pulverized to a predetermined size on the order of minus 200 mesh; of a second component in pulverized form within respective ranges of about minus 150 and minus 400 mesh consisting essentially of the following ingredients expressed on an approximate weight basis:

|  | Parts |
|---|---|
| Nickel | 26 |
| Iron | 26 |

2. The adhesive material of claim 1 wherein the quantities of ingredients of said first component, all expressed on an approximate weight basis, are:

|  | Parts |
|---|---|
| Aluminum oxide | 5 |
| Boron oxide | 50 |
| Chromium oxide | 5 |
| Silica | 40 |
| Zirconia | 0 |

3. The method of making the adhesive material of claim 1 consisting essentially of dry blending and firing at a predetermined temperature selected quantities of oxides of said first component, quenching the molten batch of said oxides in water to form said frit, drying said frit, mixing the dried frit with said suspension agent, pulverizing the resulting mixture to produce said slip, and subsequently adding said second component to said slip just prior to use of the adhesive.

4. The method of claim 3 wherein said oxides are fired at about 2650° F. for about one half (½) hour, and said frit is dried for about twelve (12) hours at a temperature of about 250° F.

References Cited

UNITED STATES PATENTS

| 1,988,800 | 1/1935 | Kinzie et al. | 106—48 |
| 2,475,470 | 7/1949 | Bennett et al. | 106—48 |
| 2,843,507 | 7/1958 | Long | 106—48 |
| 2,915,475 | 12/1959 | Bugosh | 106—39 |
| 2,944,914 | 7/1960 | Bugosh | 106—39 |
| 3,144,370 | 8/1964 | Bennett et al. | 106—48 |
| 3,175,937 | 3/1965 | Bayer et al. | 106—54 |

FOREIGN PATENTS 580,570   1/1930   Germany.

HELEN M. McCARTHY, Primary Examiner

U.S. Cl. X.R.

29—496; 106—54; 117—129; 156—89